(12) United States Patent
Agapiev

(10) Patent No.: US 8,799,296 B2
(45) Date of Patent: Aug. 5, 2014

(54) EIGENVALUE RANKING OF SOCIAL OFFERINGS USING SOCIAL NETWORK INFORMATION

(76) Inventor: Borislav Agapiev, Portland, OR (US)

(*) Notice: Subject to any disclaimer, the term of this patent is extended or adjusted under 35 U.S.C. 154(b) by 0 days.

(21) Appl. No.: 13/476,195

(22) Filed: May 21, 2012

(65) Prior Publication Data

US 2013/0226912 A1 Aug. 29, 2013

Related U.S. Application Data

(63) Continuation of application No. 13/403,069, filed on Feb. 23, 2012.

(51) Int. Cl.
*G06F 17/30* (2006.01)
(52) U.S. Cl.
CPC ....................... *G06F 17/30* (2013.01)
USPC ............ 707/748; 707/723; 707/732; 707/767
(58) Field of Classification Search
CPC ....................................................... G06F 17/30
USPC ................. 709/203, 215–220; 707/705–711, 707/723–724, 730–732, 737–741, 776–785, 707/805–806, 748–751, 767
See application file for complete search history.

(56) References Cited

U.S. PATENT DOCUMENTS

| | | | |
|---|---|---|---|
| 8,600,812 B2 * | 12/2013 | Zhang et al. ............... | 705/14.66 |
| 2003/0177077 A1 * | 9/2003 | Norman ........................ | 705/35 |
| 2005/0149502 A1 * | 7/2005 | McSherry ........................ | 707/3 |
| 2006/0026191 A1 * | 2/2006 | McSherry ..................... | 707/102 |
| 2006/0059144 A1 * | 3/2006 | Canright et al. .................. | 707/5 |
| 2006/0074905 A1 * | 4/2006 | Yun et al. ........................... | 707/5 |
| 2008/0183694 A1 * | 7/2008 | Cane et al. ....................... | 707/5 |
| 2009/0024629 A1 * | 1/2009 | Miyauchi ........................... | 707/9 |
| 2010/0036809 A1 * | 2/2010 | Gerster et al. ..................... | 707/3 |
| 2011/0022602 A1 * | 1/2011 | Luo et al. ....................... | 707/748 |
| 2011/0087658 A1 * | 4/2011 | Lunt et al. ..................... | 707/727 |
| 2011/0191417 A1 * | 8/2011 | Rathod ......................... | 709/204 |

(Continued)

FOREIGN PATENT DOCUMENTS

| | | | |
|---|---|---|---|
| WO | WO2010099111 | * | 9/2010 |
| WO | WO 2011/000046 | * | 1/2011 |

OTHER PUBLICATIONS

Muhammad U. Ilyas "Identifying Influential Nodes in Online Social Networks Using Principal Component Centrality",IEEE Communications Society subject matter experts for publication in the IEEE ICC 2011 proceedings, 5 pages.*

(Continued)

*Primary Examiner* — Srirama Channavajjala
(74) *Attorney, Agent, or Firm* — Ascenda Law Group, PC

(57) ABSTRACT

Systems and methods in which a ranking engine, for example such an engine as is communicatively coupled to a search engine or social networking system, or is part of such a system, ranks social offerings for eventual display to a user, said social offerings being ranked according to eigenvalues of matrices associated with a social graph G of the user and the user's friends and other connections. In some instances, the social offerings may be divided into categories and ranks for the social offerings computed for each of the categories based on activities and communications of the user with friends and other connections for each category. The eigenvalues are used for ranking the social offerings based on actions of the user's friends and other connections with respect to the social offerings.

26 Claims, 2 Drawing Sheets

(56) References Cited

U.S. PATENT DOCUMENTS

| | | | |
|---|---|---|---|
| 2011/0264519 A1* | 10/2011 | Chan et al. | 705/14.49 |
| 2011/0265011 A1* | 10/2011 | Taylor et al. | 715/751 |
| 2011/0296004 A1* | 12/2011 | Swahar | 709/224 |
| 2012/0066053 A1* | 3/2012 | Agarwal | 705/14.41 |
| 2012/0117059 A1* | 5/2012 | Bailey et al. | 707/723 |
| 2012/0159314 A1* | 6/2012 | Schrier et al. | 715/252 |
| 2013/0031171 A1* | 1/2013 | Serena | 709/204 |
| 2013/0103503 A1* | 4/2013 | Zhang et al. | 705/14.66 |

OTHER PUBLICATIONS

Ting Yu et al., "Monitoring, Recognizing and Discovering Social Networks", Computer Vision and Pattern Recognition, 2009. CVPR 2009. IEEE Conference Year: 2009, pp. 1462-1469.*

Bingo Wing-Kuen Ling et al., "Study of Near Consensus Complex Social Networks Using Eigen Theory", Circuits and Systems (ISCAS), 2011 IEEE International Symposium 2011, pp. 2107-2110.*

\* cited by examiner

EIGENVALUE RANKING OF SOCIAL OFFERINGS USING SOCIAL NETWORK INFORMATION

RELATED APPLICATIONS

This is a CONTINUATION of and claims priority to U.S. application Ser. No. 13/403,069, filed 23 Feb. 2012, incorporated herein by reference, now abandoned.

FIELD OF THE INVENTION

The present invention relates to systems and methods for ranking of social offerings, including but not limited to, search engine results, advertisements, commercial product and service offerings, social game offerings, movie offerings, music offerings, etc. displayed to computer users (e.g., users of search engines, social media web sites, etc.) using social network information, which systems and methods are aimed at increasing probabilities of users acting on such offerings and recommendations, by computing eigenvalues of matrices associated with social graphs of the users and their friends and other connections.

BACKGROUND

Response and click-through-rates (CTR) to online offerings are key concepts in the monetization of contemporary Internet activities. Examples of such online offerings include, but are not limited to: search engine results, advertisements, commercial product and service offerings, social game offerings, movie offerings, music offerings, travel offerings, vehicle offerings including cars, trucks, RVs and motorcycles, jobs offerings, etc. Many Internet site providers, e.g., search engine providers, social networking providers, etc., rely almost exclusively on advertising for their revenues. Much of this revenue is tied to the delivery of potential customers to other Internet sites, as measured by CTRs. The overall CTRs for offerings vary but are generally in low single-digit or a fraction of a percentage point. Hence, even a modest improvement in such low CTRs can have enormous impact on revenues.

Online offerings have different forms and appearances but all share the common property that the ultimate desired outcome is a response by a user (someone viewing the offering). For example, search engine sites such as Google™ include ads in search results returned to users in response to user queries. The ads are typically displayed in a reserved area of the page containing the search results, and often are clearly separated from so-called organic results, which are typically displayed in the middle of the page. Search engine providers often go to great lengths to delineate ads from organic results and convey to users that organic results are completely independent from the ads. On the other hand, the search engine providers may also operate popular and pervasive advertising networks, such as Google's AdSense™, which are used to provide ads to millions of Web sites. Even after clicking upon organic results, it is very likely that users will encounter ads provided by these advertising networks. Other examples of online offerings, apart from search engine results and ads, include offerings for commercial products and services, social games, vehicles, travel, video, music, movie, jobs, etc. In connections with all such offerings, various website providers include so-called sponsored results, which are also a form of offering. In summary, all such offerings, which may appear different, are actually a form of an online offering where the ultimate desired action is a response by a user.

In order to improve response rates and CTRs, Internet site providers have created behavioral profiles of users based on the types of pages and ads they view. Tracking of users by various means such as cookies or click histories can contribute to the creation and tailoring of such profiles. Likewise, social networking providers use data supplied by users during creation of accounts and common/typical Internet/social network activities (e.g., page views, "likes", comments, posts, messages, etc.) to build profiles of the users and their interests. Such profiles are then used to target offerings that are presented to the users.

Despite these attempts to deliver relevant ads the above-described methods have been met with limited success. Most of the ads shown to users are not clicked and the users to whom they are presented consider many to be irrelevant or uninteresting.

In order to increase the probability that users will respond to online offerings, it is desirable to indicate to users whether some of their friends and other connections in social networks have responded to such offerings. The idea is that an indication of a response to an offering by a friend or other connection will increase trust in the offering, based on the degree of trust the user has in a friend or other connection who have responded.

In US PGPUB 20110093346, Lunt et al describe a method for ranking ads (sponsored search results) using social networking information where ads displayed to a user in response to a search query are ranked by simple counts of clicks on such ads by their friends, within specified degrees of separation in a social graph connecting said users with their friends and other connections, e.g., friends-of-friends, or more distant connections.

SUMMARY OF THE INVENTION

The present invention provides systems and methods in which a ranking engine, for example such an engine as is communicatively coupled to a search engine or social networking system, or is part of such a system, ranks social offerings for eventual display to a user, said social offerings being ranked according to eigenvalues of matrices associated with a social graph G of the user and the user's friends and other connections. In some instances, the social offerings may be divided into categories and ranks for the social offerings computed for each of the categories based on activities and communications of the user with friends and other connections for each category. The eigenvalues are used for ranking the social offerings based on actions of the user's friends and other connections with respect to the social offerings.

In one embodiment of the invention, for the social graph G describing connections between the user and the user's friends and other connections, a connectivity matrix C(G) having N rows and columns and being defined as $$C[i][j] = \begin{cases} 1/N_j, & \text{if node } i \text{ is connected to node } j \\ 0 & \text{otherwise} \end{cases}$$

is computed and the eigenvalues comprise a principal eigenvalue of the connectivity matrix C(G). Values in a principal eigenvector associated with the principal eigenvalue of the connectivity matrix C(G) are used as ranks of nodes (users) in the social graph G and ranks of social offerings are then computed as sums of ranks of nodes (users) in the social graph. Computation of the principal eigenvalue of the connectivity matrix is carried out as an iterative process where a rank vector R of length N, where N is the number of nodes in the social graph G, associated with ranks of nodes in the social graph G, is initialized to a vector of non-zero values and then successively iterated according to:

$$R_i = \sum_{j \text{ connected to } i} \frac{R_j}{N_j}$$

where $N_j$ is a number of edges connecting node j to other nodes.

In other instances, for each user, a social graph with weights corresponding to levels of activity (affinity) between users may be created. Users who are more active in interacting with each other are assigned higher weights. Then, for the social graph G describing connections between the user and the user's friends and other connections, a connectivity matrix C(G) is computed and the eigenvalues comprise a principal eigenvalue of the connectivity matrix C(G), said principal eigenvalue of the connectivity matrix being computed through an iterative process where a rank vector R of length N, where N is the number of nodes in the social graph G, associated with ranks of nodes in the social graph G, is initialized to a vector of non-zero values and then successively iterated according to $$R_i = \sum_{j \text{ connected to } i} R_j p_{ji}$$

where a sum of all affinities $p_{ji}$ to friends of a node j, is equal to 1:

$$\sum_i p_{ji} = 1, \ p_{ji} \geq 0$$

and a vector of affinities $P_j$ for each user j, consisting of values $p_{ji}$ forms a discrete probability distribution. The probabilities may be derived from activities of users in interacting with each other.

A subject ad determined as being relevant for display, and so displayed to the user, may, or may not, be accompanied by information indicating that a known friend, or another connection, of the user has clicked on the subject ad. Further, an order in which friends or connections of the user are displayed along with the subject ad may be determined by computed ranks.

These and further embodiments of the invention are described in greater detail below.

BRIEF DESCRIPTION OF THE DRAWINGS

The present invention is illustrated by way of example, and not limitation, in the figures of the accompanying drawings, in which.

DETAILED DESCRIPTION

Described herein are systems and methods for social ranking of social offerings displayed to users, which systems and methods are aimed at increasing click-through rates. In one embodiment of the invention, click-through rates of social offerings are increased by ranking social offerings based on eigenvalues of matrices associated with social graphs of users and their friends and other connections. In the context of the present invention, we designate online offerings enhanced by social information from friends and other connection as social offerings. In some instances, the social offerings may be divided into categories and rankings for social offerings computed for each subject category based on activities and communications of users with their friends/connections for the subject category.

It is assumed that users are more likely to click on social offerings on which their friends clicked, ranked by the importance and influence of their friends. Accordingly, methods and systems in accordance with the present invention provide for the display of social offerings that are deemed relevant to the user of a computer system; that relevance being determined by eigenvalues of matrices associated with social graphs describing the connectivity of the subject user with his/her friends and other connections. The computed eigenvalues are used for ranking the social offerings based on actions of the user's friends and other connections with respect to those social offerings. In contrast to systems and methods where the relevance of social offerings and likely CTRs are computed from simple counts of clicks of friends and other connections, such as friends-of-friends and more distant ones, the use of eigenvalues allow the present systems and methods to create a more precise and refined ranking.

Consider an example in which in response to a query (e.g., a search query entered by a user at an Internet search engine), a list of two social offerings matching the query is returned and for both social offerings there is an equal number of clicks by friends and other connections. A system that uses only simple counts of clicks by friends and other connections will not be able to distinguish between such social offerings and both will be ranked equally. The present invention, however, distinguishes between such social offerings by computing eigenvalues of matrices associated with connectivity of the subject user and his/her friends/connections in order to assign ranks to the user's friends and other connections. In this system, numbers of clicks are replaced by sums of ranks of friends and other connections that clicked on the social offerings so the system is able to distinguish between cases where number of clicks by friends and other connections are equal but their weights are not.

Figure 1:
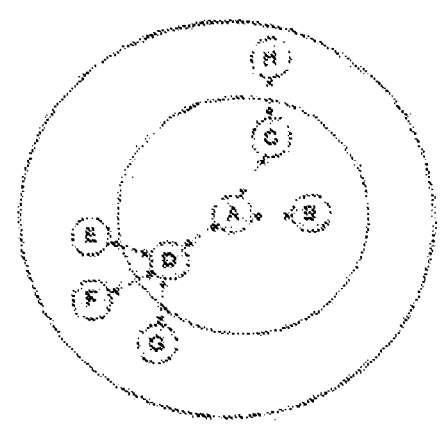
FIG. 1 illustrates an example of a social graph for a user A, which social graph is used in embodiments of the present invention to rank social offerings for display to user A.

This example is illustrated in FIG. 1. Assume that user A has submitted a query and two social offerings, A1 and A2, have matched the query. Consider a case in which the first ad A1 has been clicked on by user A friends B and C. The second ad A1 has been clicked by user A friends B and D. In a simple case where only clicks are counted, both social offerings, A1 and A2, will have two clicks from direct friends and will be equally ranked. By using eigenvalue ranking, however, friend D will have higher weight and ranking because D has more connections. Hence, ad A2 will be ranked higher than ad A1 because the sum of weights of D and B will be higher than the sum of weights of B and C.

In systems and methods configured in accordance with the present invention, a connectivity matrix C is associated with a social graph G describing connections between users and their friends and other connections, such as friends-of-friends and more distant connections. Assume N is the number of nodes in a social graph G. The connectivity matrix C(G) will have N rows and columns and is defined as $$C[i][j] = \begin{cases} 1/N_j, & \text{if node } i \text{ is connected to node } j \\ 0 & \text{otherwise} \end{cases} \quad (\text{eq. 1})$$

In accordance with embodiments of the present invention, the principal eigenvalue of the connectivity matrix C(G) is computed, together with the associated principal eigenvector. The values in the principal eigenvector are used as ranks of nodes (users) in the graph. Ranks of social offerings are then computed as sums of ranks of nodes (users) in the graph, as opposed to a simple number of users who clicked on an ad.

The computation of the principal eigenvalue of the connectivity matrix can be carried out as an iterative process where a rank vector R of length N, where N is the number of nodes in the social graph G, associated with ranks of nodes in the social graph G, is initialized to a vector of non-zero values and then successively iterated according to the iterative formula:

$$R_i = \sum_{j \text{ connected to } i} \frac{R_j}{N_j} \quad (\text{eq. 2})$$

In the above equation (2), $N_j$ is the number of edges connecting node j to other nodes.

In addition to a single social graph describing global connectivity of users to their friends and other connections, in one embodiment of the present invention for each user we create a social graph with weights corresponding to levels of activity (affinity) between users. Users who are more active in interacting with each other are assigned higher weights. In such an embodiment of the present invention, the above formula becomes $$R_i = \sum_{j \text{ connected to } i} R_j p_{ji} \quad (\text{eq. 3})$$

The sum of all affinities $p_{ji}$ to friends of a node j, is equal to 1:

$$\sum_i p_{ji} = 1, \, p_{ji} \geq 0 \quad (\text{eq. 4})$$

The vector of affinities $P_j$ for each user j, consisting of values $p_{ji}$ forms a discrete probability distribution.

In such an embodiment of the present invention, these probabilities can be derived from activities of users in interacting with each other. Examples of such activities include, but are not limited to, "liking" each other's posts, comments, photos, videos or other objects created by others, sending and responding to messages, etc.

In embodiments of the present invention, a subject ad determined as being relevant for display, and so displayed to a user, may or may not be accompanied by information indicating that a known friend, or another connection, of the user has clicked on the subject ad. Further, in some instances the displayed friends or connections of the user who clicked on the subject ad may also be ranked according to one or more criteria. That is, the order in which the subject friends or connections are presented along with the subject ad may be determined by computed ranks, for example such ranks as are computed in accordance with the procedures described herein.

In some instances, systems configured in accordance with the present invention may divide social offerings into categories, e.g., automotive, electronics, cameras, computers, boats, etc., and compute affinities between users for each category. In this manner, instead of a single scalar value for an affinity between two users who are friends in a social network, there is a vector of values describing affinities between the users for each category. In such cases, the present system may compute eigenvalues and associated rankings for each category of social offerings. In determining which social offerings to display to a user, the system may then take into account ranks of social offerings from their friends and other connections in specific categories.

Figure 2:
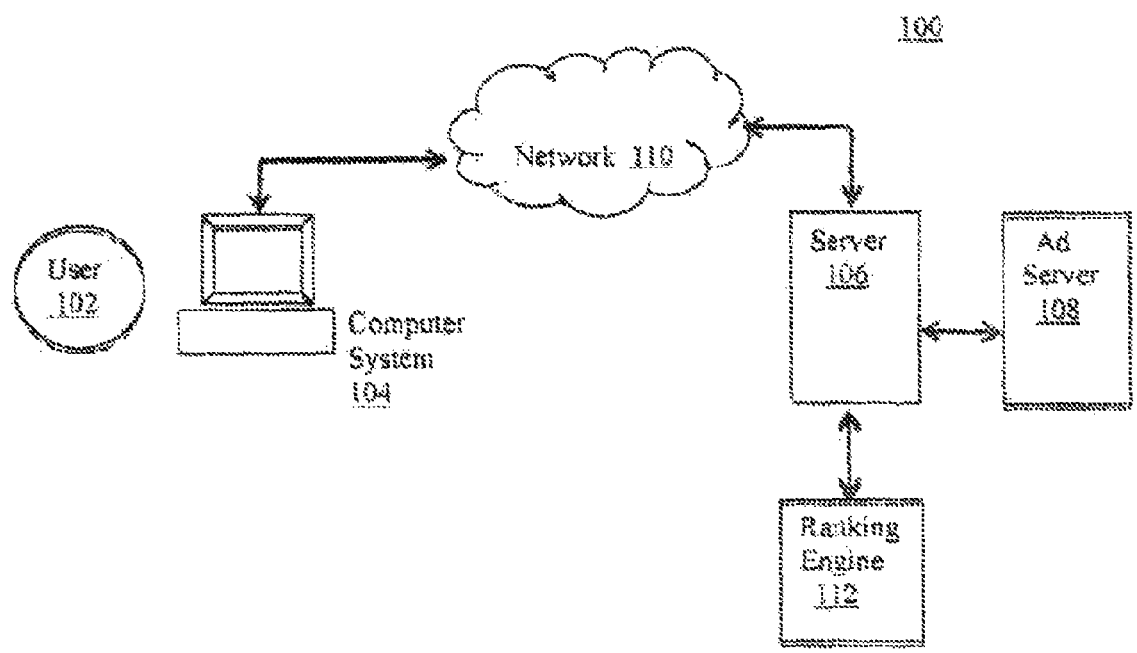
FIG. 2 illustrates an example of a network within which embodiments of the present invention may be implemented.

FIG. 2 illustrates an example of a system 100 configured in accordance with embodiments of the present invention. In this simplified illustration, a user 102 at a computer station 104 is communicatively connected to a server 106 hosting a search engine, social networking system or other application through or with which social offerings are displayed for the user. Such social offerings may be served by a separate ad server 108 or other means. The user's computer system 104 may be so coupled through one or more networks 110, e.g., the Internet. Associated with server 106 is a ranking engine 112, which may be a separate ranking engine or may be incorporated as part of the search engine or other means by which social offerings are provided to the user. Ranking engine 112 is configured to compute the ad relevance and rankings described above based on analyses of the user's social graph, and then cause the search engine or social networking system, etc., to deliver the social offerings in ranked order to the user in response to queries and the like.

Figure 3:
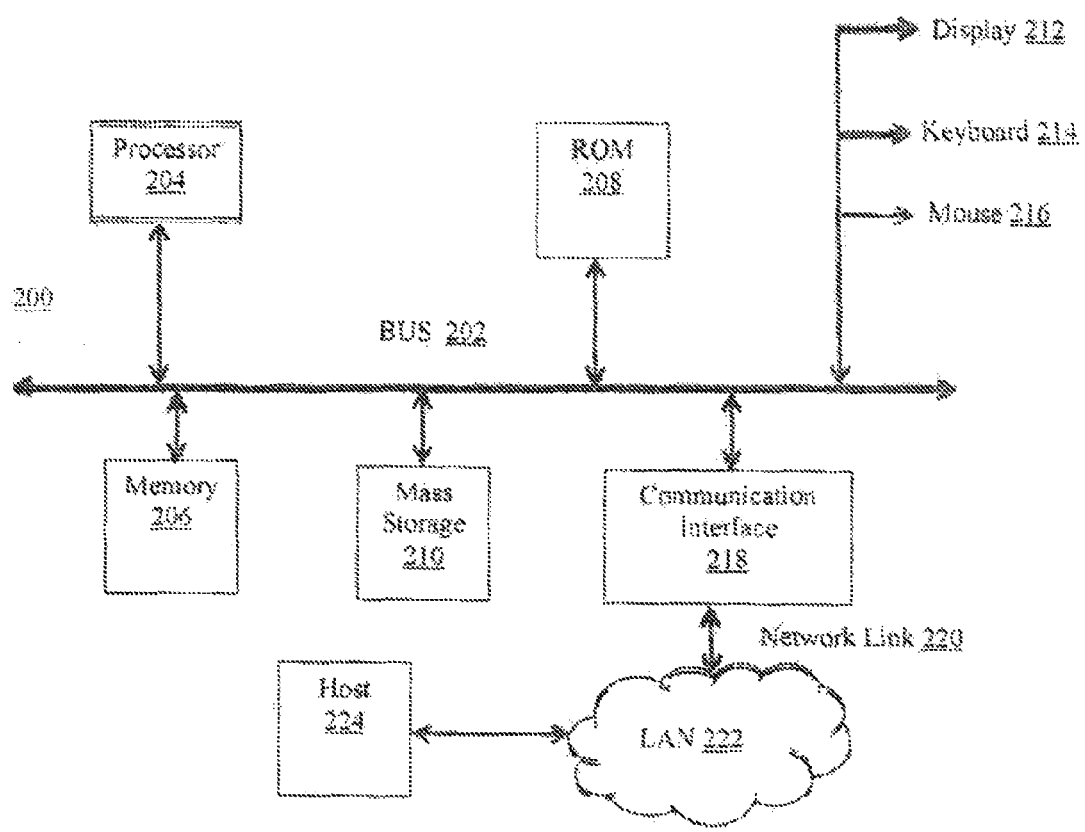
FIG. 3 illustrates an example of a computer system suitable for use as a ranking engine for computing social ranking of social offerings for display to users by ranking social offerings based on eigenvalues of matrices associated with social graphs of users and their friends and other connections, in accordance with the present invention.

An example of a computer system suitable for use in accordance with these principles is shown in FIG. 3. Computer system 200, which may be any of user computer system 104, server 106, ad server 108 or ranking engine 112, includes a bus 202 or other communication mechanism for communicating information, and a processor 204 coupled with the bus 202 for processing information. Computer system 200 also includes a main memory 206, such as a RAM or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a ROM 208 or other static storage device coupled to the bus 202 for storing static information and instructions for the processor 204. A mass storage device 210, such as a hard disk, is provided and coupled to the bus 202 for storing information and instructions.

Where used as a user's computer system, computer system 200 may be coupled via the bus 202 to a display 212 for displaying information to a computer user. An input device 214, including alphanumeric and other keys, is coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212.

Computer system 200 also includes a communication interface 218 coupled to the bus 202. Communication interface 218 provides for two-way, wired and/or wireless data communication to/from computer system 200, for example, via a local area network (LAN). Communication interface 218 sends and receives electrical, electromagnetic or optical signals that carry digital data streams representing various types of information. For example, two or more computer systems 200 may be networked together in a conventional manner with each other using a respective communication interface 218.

Network link 220 typically provides data communication through one or more networks to other data devices. For example, network link 220 may provide a connection through LAN 222 to a host computer 224 or to data equipment operated by an Internet service provider (ISP). The ISP may in turn provide data communication services through the Internet, which, in turn, may provide connectivity to multiple remote computer systems, as illustrated in FIG. 2 (any or all of which may be similar to computer system 200).

As should be apparent from the foregoing discussion, various embodiments of the present invention may be implemented with the aid of computer-implemented processes or methods (i.e., computer programs or routines) or on any programmable or dedicated hardware implementing digital logic. Such processes may be rendered in any computer language including, without limitation, a object oriented programming language, assembly language, markup languages, and the like, as well as object-oriented environments such as the Common Object Request Broker Architecture (CORBA), Java™ and the like, or on any programmable logic hardware like CPLD, FPGA and the like.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities. The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, keys, numbers or the like. It should be borne in mind, however, that all of these and similar terms are to be associated with the appropriate physical quantities and are merely convenient labels applied to these quantities.

Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media. Embodiments of the present invention can be implemented with apparatus to perform the operations described herein. Such apparatus may be specially constructed for the required purposes, or may be appropriately programmed, or selectively activated or reconfigured by computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

Thus, systems and methods for social ranking of social offerings displayed to users, which systems and methods are aimed at increasing click-through rates, have been described. Although discussed with reference to certain examples, the present invention should not be limited thereby. Instead, the invention should be measured only in terms of the claims, which follow.

What is claimed is:

1. A computer-based system comprising a processor and a memory, said memory storing computer readable instructions which, when executed by said processor cause said processor to rank social offerings for eventual display to a user, said social offerings ranked according to eigenvalues of matrices associated with a social graph G describing connections between the user, the user's friends and other individuals within a social network of the user.

2. The computer-based system of claim 1, wherein the social offerings are divided into categories and ranks for the social offerings are computed, for each of the categories, based on activities and communications of the user with the user's friends and other individuals within the social network of the user for each category.

3. The computer-based system of claim 1, wherein the eigenvalues are used for ranking the social offerings based on actions of the user's friends and other individuals within the social network of the user with respect to the social offerings.

4. The computer-based system of claim 1, wherein for the social graph G describing connections between the user and the user's friends and other individuals within the social network of the user, a connectivity matrix C(G) having N rows and columns and being defined as $$C[i][j] = \begin{cases} 1/N_j, & \text{if node } i \text{ is connected to node } j \\ 0 & \text{otherwise} \end{cases}$$

is computed and the eigenvalues comprise a principal eigenvalue of the connectivity matrix C(G), where $N_j$ is a number of edges connecting node j to other nodes in the social graph G.

5. The computer-based system of claim 4, wherein values in a principal eigenvector associated with the principal eigenvalue of the connectivity matrix C(G) are used as ranks of nodes (users) in the social graph G and ranks of the social offerings are then computed as sums of ranks of nodes (users) in the social graph.

6. The computer-based system of claim 5, wherein computation of the principal eigenvalue of the connectivity matrix is carried out as an iterative process where a rank vector R of length N, where N is the number of nodes in the social graph G, associated with ranks of nodes in the social graph G, is initialized to a vector of non-zero values and then successively iterated according to:

$$R_i = \sum_{j \text{ connected to } i} \frac{R_j}{N_j}$$

where $N_j$ is a number of edges connecting node j to other nodes in the social graph G.

7. The computer-based system of claim 1, wherein for each user a social graph with weights corresponding to levels of activity (affinity) between users is created.

8. The computer-based system of claim 7, wherein users who are more active in interacting with each other are assigned higher weights.

9. The computer-based system of claim 8, wherein for the social graph G describing connections between the user and the user's friends and other individuals within the social network of the user, a connectivity matrix C(G) is computed and the eigenvalues comprise a principal eigenvalue of the connectivity matrix C(G), said principal eigenvalue of the connectivity matrix being computed through an iterative process where a rank vector R of length N, where N is the number of nodes in the social graph G, associated with ranks of nodes in the social graph G, is initialized to a vector of non-zero values and then successively iterated according to $$R_i = \sum_{j \text{ connected to } i} R_j p_{ji}$$

where a sum of all affinities $p_{ji}$ to friends of a node j, is equal to 1:

$$\sum_i p_{ji} = 1, \; p_{ji} \geq 0$$

and a vector of affinities $P_j$ for each user j, consisting of values $p_{ji}$ forms a discrete probability distribution.

10. The computer-based system of claim 9, wherein the probabilities are derived from activities of users in interacting with each other.

11. The computer-based system of claim 1, wherein a subject ad determined as being relevant for display, and so displayed to the user, is accompanied by information indicating that a known friend of the user or another individual within the social network of the user has clicked on the subject ad.

12. The computer-based system of claim 11, wherein an order in which friends or connections of the user are displayed along with the subject ad is determined by computed ranks.

13. The computer-based system of claim 1, wherein the social offerings comprise one or more of: search engine search results, advertisements, commercial product or service offerings, social game offerings, movie offerings, music offerings, travel offerings, vehicle offerings, and jobs offerings.

14. A method, comprising ranking, by a ranking engine of a computer system and communicatively coupled to a search engine or social networking system, social offerings for eventual display to a user, said social offerings being ranked according to eigenvalues of matrices associated with a social graph G describing connections between the user, the user's friends and other individuals within a social network of the user.

15. The method of claim 14, wherein the social offerings are divided into categories and ranks for the social offerings are computed, for each of the categories, based on activities and communications of the user with the user's friends and other individuals within the social network of the user for each category.

16. The method of claim 14, wherein the eigenvalues are used for ranking the social offerings based on actions of the user's friends and other individuals within the social network of the user with respect to the social offerings.

17. The method of claim 14, wherein for the social graph G describing connections between the user and the user's friends and other individuals within the social network of the user, a connectivity matrix C(G) having N rows and columns and being defined as $$C[i][j] = \begin{cases} 1/N_j, & \text{if node } i \text{ is connected to node } j \\ 0 & \text{otherwise} \end{cases}$$

is computed and the eigenvalues comprise a principal eigenvalue of the connectivity matrix C(G), where $N_j$ is a number of edges connecting node j to other nodes in the social graph G.

18. The method of claim 17, wherein values in a principal eigenvector associated with the principal eigenvalue of the connectivity matrix C(G) are used as ranks of nodes (users) in the social graph G and ranks of the social offerings are then computed as sums of ranks of nodes (users) in the social graph.

19. The method of claim 17, wherein computation of the principal eigenvalue of the connectivity matrix is carried out as an iterative process where a rank vector R of length N, where N is the number of nodes in the social graph G, associated with ranks of nodes in the social graph G, is initialized to a vector of non-zero values and then successively iterated according to:

$$R_i = \sum_{j \text{ connected to } i} \frac{R_j}{N_j}$$

where $N_j$ is a number of edges connecting node j to other nodes in the social graph G.

20. The method of claim 14, wherein for each user a social graph with weights corresponding to levels of activity (affinity) between users is created.

21. The method of claim 20, wherein users who are more active in interacting with each other are assigned higher weights.

22. The method of claim 21, wherein for the social graph G describing connections between the user and the user's friends and other individuals within the social network of the user, a connectivity matrix C(G) is computed and the eigenvalues comprise a principal eigenvalue of the connectivity matrix C(G), said principal eigenvalue of the connectivity matrix being computed through an iterative process where a rank vector or R of length N, where N is the number of nodes in the social graph G, associated with ranks of nodes in the social graph G, is initialized to a vector of non-zero values and then successively iterated according to $$R_i = \sum_{j \text{ connected to } i} R_j p_{ji}$$

where a sum of all affinities $p_{ji}$ to friends of a node j, is equal to 1:

$$\sum_i p_{ji} = 1, p_{ji} \geq 0$$

and a vector of affinities $P_j$ for each user j, consisting of values $p_{ji}$ forms a discrete probability distribution.

23. The method of claim 22, wherein the probabilities are derived from activities of users in interacting with each other.

24. The method of claim 14, wherein a subject ad determined as being relevant for display, and so displayed to the user, is accompanied by information indicating that a known friend of the user or another individual within the social network of the user has clicked on the subject ad.

25. The method of claim 24, wherein an order in which friends or connections of the user are displayed along with the subject ad is determined by computed ranks.

26. The method of claim 14, wherein the social offerings comprise one or more of:

search engine search results, advertisements, commercial product or service offerings, social game offerings, movie offerings, music offerings, travel offerings, vehicle offerings, and jobs offerings.

* * * * *